(12) United States Patent
Marwah et al.

(10) Patent No.: US 11,178,011 B1
(45) Date of Patent: Nov. 16, 2021

(54) IDENTIFYING REPRESENTATIVE ENTITIES IN CLUSTERS FOR IT MANAGEMENT

(71) Applicant: MICRO FOCUS LLC, Santa Clara, CA (US)

(72) Inventors: Manish Marwah, Santa Clara, CA (US); Martin Arlitt, Santa Clara, CA (US)

(73) Assignee: MICRO FOCUS LLC, Santa Clara, CA (US)

(*) Notice: Subject to any disclaimer, the term of this patent is extended or adjusted under 35 U.S.C. 154(b) by 0 days.

(21) Appl. No.: 16/931,204

(22) Filed: Jul. 16, 2020

(51) Int. Cl.
*H04L 12/24* (2006.01)
*G06F 16/901* (2019.01)
*G06K 9/62* (2006.01)

(52) U.S. Cl.
CPC ...... *H04L 41/0893* (2013.01); *G06F 16/9024* (2019.01); *G06K 9/6218* (2013.01); *H04L 41/14* (2013.01)

(58) Field of Classification Search
CPC . H04L 41/0893; H04L 41/14; G06F 16/9024; G06K 9/6218
See application file for complete search history.

(56) References Cited

U.S. PATENT DOCUMENTS

| | | | |
|---|---|---|---|
| 8,230,259 B2 | 7/2012 | Fernandess et al. | |
| 9,077,580 B1* | 7/2015 | Randhawa | H04L 67/1023 |
| 10,356,106 B2 | 7/2019 | Engel et al. | |
| 10,592,516 B2 | 3/2020 | Azvine et al. | |
| 10,924,947 B2* | 2/2021 | Gray | H04W 24/02 |
| 2012/0053983 A1* | 3/2012 | Vittal | F03D 80/50 705/7.28 |
| 2014/0122718 A1* | 5/2014 | Thoppai | H04L 67/1097 709/225 |
| 2014/0310258 A1* | 10/2014 | Tian | G06F 16/24532 707/718 |
| 2016/0357424 A1* | 12/2016 | Pang | H04L 61/2007 |
| 2018/0255084 A1 | 9/2018 | Kotinas et al. | |
| 2020/0162341 A1 | 5/2020 | Vasseur et al. | |
| 2020/0267580 A1* | 8/2020 | Gray | H04L 12/2861 |
| 2021/0084103 A1* | 3/2021 | Smith | H04L 67/1008 |
| 2021/0089379 A1* | 3/2021 | Aikawa | G06F 11/0772 |

OTHER PUBLICATIONS

Ahmed, Mohiuddin, Abdun Naser Mahmood, and Jiankun Hu. "A survey of network anomaly detection techniques." Journal of Network and Computer Applications 60 (2016): pp. 19-31.

(Continued)

*Primary Examiner* — Michael Won

(57) ABSTRACT

According to examples, an apparatus may include a memory on which is stored instructions that when executed by a processor, cause the processor to extract, from network traffic data, a connectivity matrix that identifies connectivity data between entities and group the entities into a plurality of clusters based on the extracted connectivity matrix. The processor may also, for each cluster of the plurality of clusters, identify at least one representative entity that is to represent the entities in the cluster and output the identified at least one representative entity for identification of group behaviors of the entities in the plurality of clusters, in which the identified group behaviors are to be used for information technology management.

20 Claims, 6 Drawing Sheets

(56) References Cited

OTHER PUBLICATIONS

Beukema et al., "Internal Network Monitoring and Anomaly Detection Through Host Clustering", ICISSP 2017, pp. 694-703.
Chandola, Varun, Arindam Banerjee, and Vipin Kumar. "Anomaly detection: A survey." ACM computing surveys (CSUR) 41.3 (Sep. 2009): pp. 1-72.
Erman, Jeffrey, Martin Arlitt, and Anirban Mahanti. "Traffic classification using clustering algorithms." Proceedings of the 2006 SIGCOMM workshop on Mining network data. 2006, 6 pages.
Liu, Yingqiu, Wei Li, and Yun-Chun Li. "Network traffic classification using k-means clustering." Second international multi-symposlums on computer and computational sciences (IMSCCS 2007). IEEE, 2007, pp. 360-365.
Maaten, Laurens van der, and Geoffrey Hinton. "Visualizing data using t-SNE." Journal of machine learning research 9, Nov. 2008: pp. 2579-2605.
McInnes, L, Healy. J, Umap: Uniform Manifold Approximation and Projection for Dimension Reduction, Dec. 7, 2018, 51 pages. ArXiv e-prints 1802.03426v2, 2018.
Saeed, Nasir, et al. "A survey on multidimensional scaling." ACM Computing Surveys (CSUR) 51.3 (2018): pp. 1-25.
Scholkopf, Bernhard (1998). "Nonlinear Component Analysis as a Kernel Eigenvalue Problem". Neural Computation. 10 (5): pp. 1299-1319.
Wikipedia, "Cluster analysis", downloaded from the internet on Jun. 30, 2020, 21 pages.
Wikipedia, "Elbow method (clustering)", downloaded from the Internet on Jun. 30, 2020, 2 pages.
Wikipedia, "Matching (graph theory", downloaded from the Internet on Jun. 30, 2020, 8 pages.
Wikipedia, "Principal Component analysis", downloaded from the internet on Jun. 30, 2020, 28 pages.
Wikipedia, "Silhouette (clustering)", downloaded from the Internet on Jun. 30, 2020, 3 pages.

\* cited by examiner

IDENTIFYING REPRESENTATIVE ENTITIES IN CLUSTERS FOR IT MANAGEMENT

BACKGROUND

Entities in organizations often communicate with entities inside the organizations as well as entities outside of the organizations through a network. As organizations may have relatively large numbers of entities and the entities may send and receive relatively large numbers of communications, the amount of data corresponding to the network traffic may be immense. Organizations may often monitor the network traffic data to identify and prevent attacks on their networks.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
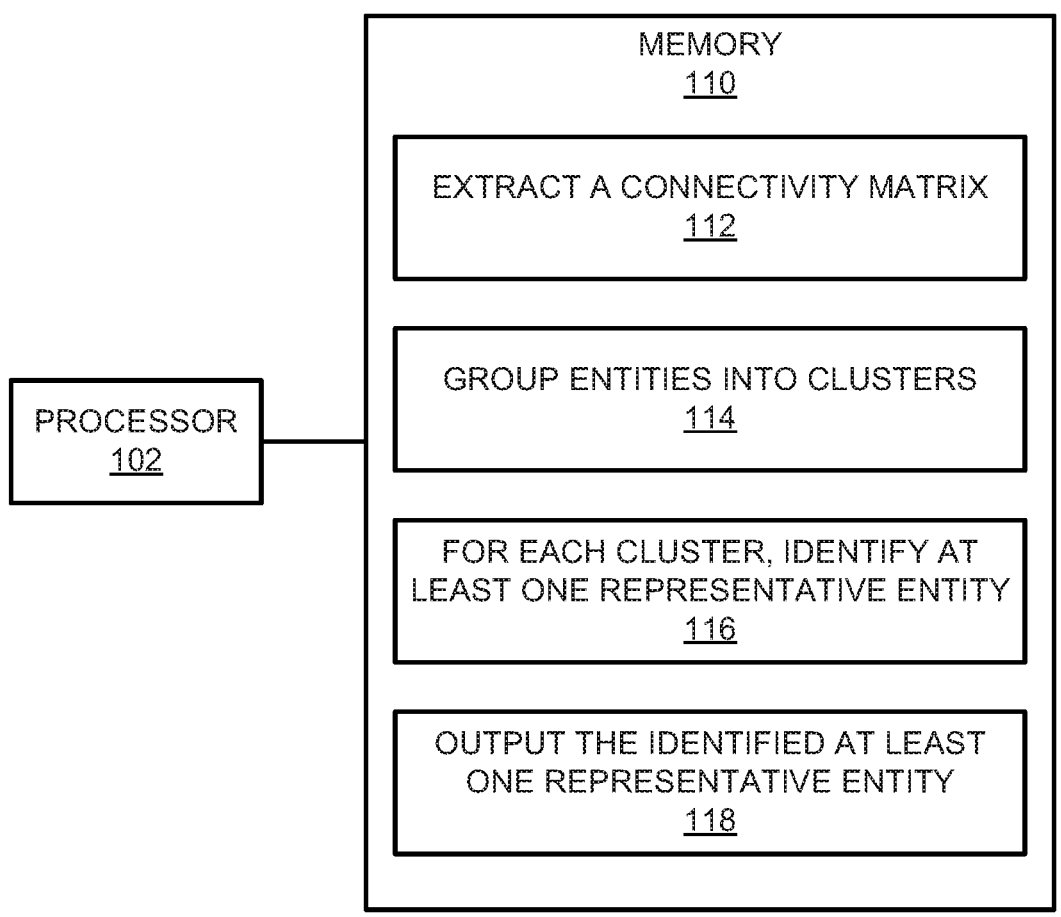
FIG. 1 shows a block diagram of an example apparatus that may identify and output at least one representative entity for identification of group behaviors of entities in a plurality of clusters, in which the identified group behaviors may be used for information technology (IT) management.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Disclosed herein are apparatuses, methods, and computer-readable mediums, in which a processor may identify representative entities that are to respectively represent entities in each of a plurality of clusters of the entities. The processor may also output the identified representative entities, in which the identified representative entities may be used for identification of group behaviors of the entities in each of the clusters. That is, the behaviors of the representative entities may be identified and may be imparted onto the clusters and thus the entities in the clusters. In addition, the behaviors imparted on the entities of the clusters may be used to identify, for instance, when a behavior of an entity may be anomalous. Moreover, when such an anomalous behavior is identified, an action may be taken to block and/or mitigate the behavior to thus enhance IT management, e.g., security, configuration of components, IT capacity planning, and/or the like, on a network. For instance, identification of the anomalous behavior may be used to find misconfigurations, which may assist in the improvement of IT services and capacity planning. By way of example, decisions as to whether to add additional capacity, maintain current capacity, or decrease capacity may be made based on a prevalent behavior in the majority of the clusters.

As discussed herein, the processor may extract, from network traffic data, a connectivity matrix that identifies connectivity data between entities and may group the entities into the plurality of clusters based on the extracted connectivity matrix. The processor may also identify the representative entities of the clusters through implementation of a cluster characterization operation. In addition, the processor may group the entities into additional clusters over successive time periods to identify groups that have emerged, groups that have reemerged, groups that have become defunct, and groups that are continuing over the successive time periods. As such, for instance, the processor may track how the clusters of entities may change over time, which may be useful in identifying the group behaviors of the entities in the clusters and for performing IT management operations.

A technical issue with IT management operations, which may include network security operations, is that there may be an immense amount of data collected pertaining to a large number of entities and communications between the entities. As such, determining normal behavior of the entities may consume a great deal of processing resources both in terms of computing power and computing time. This may also make it difficult to identify anomalous behavior and thus make a network susceptible to attacks, such as malware attacks, denial of service attacks, and/or the like, as well to optimize network configurations. A technical solution disclosed herein may be that normal or expected behaviors of the entities may be determined using less processing resources by identifying representative entities of the clusters to which the entities belong. That is, instead of determining the normal or expected behaviors of all of the entities, the normal or expected behaviors of the representative entities may be determined and may be imparted as group level behaviors. This may also assist in implementing more robust IT management, e.g., network security, as the normal or expected behaviors of the entities may more efficiently be identified and may be used to determine anomalous behavior.

Figure 2:
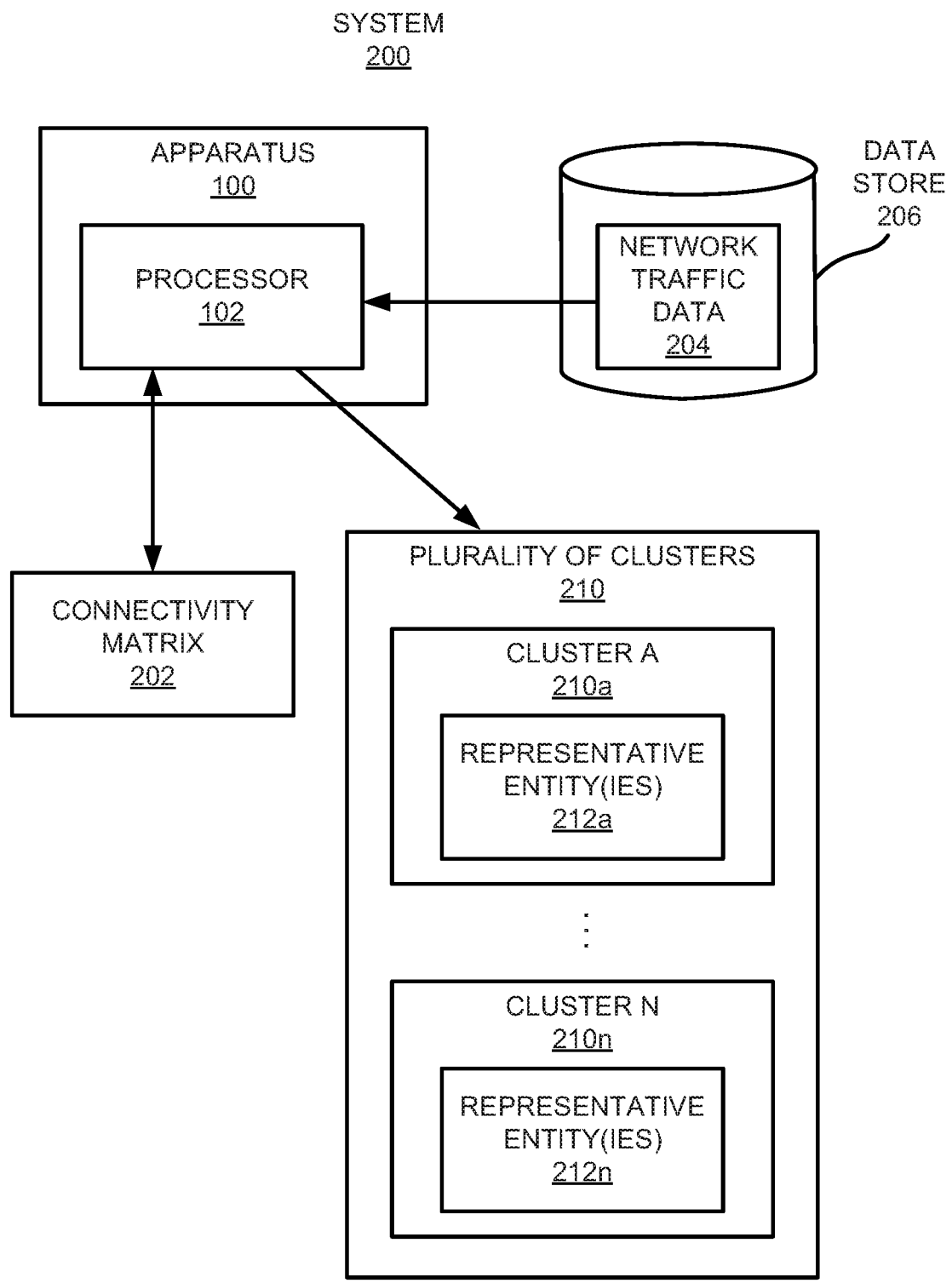
FIG. 2 shows a block diagram of an example system in which the example apparatus depicted in FIG. 1 may be implemented.

Reference is first made to FIGS. 1 and 2. FIG. 1 shows a block diagram of an example apparatus 100 that may identify and output at least one representative entity for identification of group behaviors of entities in a plurality of clusters, in which the identified group behaviors may be used for IT management. FIG. 2 shows a block diagram of an example system 200 in which the apparatus 100 depicted in FIG. 1 may be implemented. It should be understood that the example apparatus 100 depicted in FIG. 1 and/or the example system 200 depicted in FIG. 2 may include additional features and that some of the features described herein may be removed and/or modified without departing from the scopes of the apparatus 100 and/or the system 200.

The apparatus 100 may be a computing system such as a server, a laptop computer, a tablet computer, a desktop computer, or the like. As shown, the apparatus 100 may include a processor 102, which may be a semiconductor-based microprocessor, a central processing unit (CPU), an application specific integrated circuit (ASIC), a field-programmable gate array (FPGA), and/or other suitable hardware device. The apparatus 100 may also include a memory 110 that may have stored thereon machine-readable instructions (which may equivalently be termed computer-readable instructions) that the processor 102 may execute. The memory 110 may be an electronic, magnetic, optical, or other physical storage device that contains or stores executable instructions. The memory 110 may be, for example, Random-Access memory (RAM), an Electrically Erasable Programmable Read-Only Memory (EEPROM), a storage device, an optical disc, and the like. The memory 110, which may also be referred to as a computer-readable storage medium, may be a non-transitory machine-readable storage medium, where the term "non-transitory" does not encompass transitory propagating signals.

As shown in FIG. 1, the memory 110 may have stored thereon machine-readable instructions 112-118 that the processor 102 may execute. Although the instructions 112-118 are described herein as being stored on the memory 110 and may thus include a set of machine-readable instructions, the apparatus 100 may include hardware logic blocks that may perform functions similar to the instructions 112-118. For instance, the processor 102 may include hardware components that may execute the instructions 112-118. In other examples, the apparatus 100 may include a combination of instructions and hardware logic blocks to implement or execute functions corresponding to the instructions 112-118. In any of these examples, the processor 102 may implement the hardware logic blocks and/or execute the instructions 112-118. As discussed herein, the apparatus 100 may also include additional instructions and/or hardware logic blocks such that the processor 102 may execute operations in addition to or in place of those discussed above with respect to FIG. 1.

With reference to FIGS. 1 and 2, the processor 102 may execute the instructions 112 to extract a connectivity matrix 202 that identifies connectivity data between entities. As discussed herein, the entities may refer to any entity associated with network traffic, such as an IP address, a media access control (MAC) address, a host, a machine, and/or a user. According to examples, the processor 102 may extract the connectivity matrix 202 from network traffic data 204, which may be stored in a data store 206. The network traffic data 204 may be, for instance, IP addresses of communicating entities, timestamps of communications, source IP addresses and port numbers, destination IP addresses and port numbers, number of bytes exchanged, number of packets exchanged, duration, etc.

Additionally, the network traffic data 204 may be data collected at any suitable device on a network, such as an edge router of an enterprise or organization, a network switch, a server, and/or the like. By way of particular example, the network traffic data 204 may be in the form of netflow logs, which may aggregate information about network flows or connections; proxy and firewall logs, which save information of connections going through them, including HTTP requests and responses; intrusion detection system logs, which summarize activities observed in network flows or connections; and/or the like.

The processor 102 may extract the connectivity matrix 202 to denote connectivity information between entities. Particularly, for instance, the processor 102 may extract connectivity information between entities from the network traffic data 204 such that, for each pair of entities, the connectivity matrix 202 may contain the frequency of connections. In many cases, the connectivity matrix 202 may be symmetric, that is, (i, j)=(j, i). However, the connectivity matrix 202 may be asymmetric if some distinguishing feature indicating directionality is available, for example, the entity that initiated a connection, the direction of data transfer in the network traffic data 204, and/or the like. An example of a connectivity matrix is shown below:

$$\begin{pmatrix} f_{11} & \cdots & f_{1n} \\ \vdots & \ddots & \vdots \\ f_{n1} & \cdots & f_{nn} \end{pmatrix}$$

where $f_{ij}$ may be the frequency of communication between entities i and j. In other examples, $f_{ij}$ may be the number of flows, the number of bytes exchanged, the number of packets exchanged, or any other feature relating entities i and j.

The processor 102 may extract the connectivity matrix 202 over a window of time. In addition, the processor 102 may repeat the extraction of the connectivity matrix 202 for multiple time windows. The time windows may be, for instance, an hour or multiple hours, a day, a week, a month, or the like. Based on the specific $f_{ij}$ and time window, the processor 102 may extract multiple connectivity matrices 202, e.g., in which the $f_{ij}$ in each of the connectivity matrices 202 may correspond to different types of features.

In some instances, the network traffic data 204 may be relatively large in volume, e.g., terabytes or more. In these instances, the processor 102 may use a columnar database to extract the connectivity matrix 202. In addition, an organization or enterprise may include a relatively large number of entities and the entities may connect to a relatively large number of entities, both internal to the organization or enterprise and outside of the organization or enterprise. As a result, the connectivity matrix 202 may be relative large, e.g., may include billions or trillions of entries. However, since a particular entity may typically only connect to a limited number of other entities, the connectivity matrix 202 may be very sparse, and thus the storage space required is O(#num. of entries), which may be more manageable, instead of $O(n^2)$. As the connectivity matrix 202 may be sparse, the processor 102 may use a sparse matrix storage format where only the non-zero elements are saved. Further, if only a subset of the entities is of interest, the processor 102 may filter out the rest of the entities. For instance, if only m entities are of interest then the number of rows in the connectivity matrix 202 will be m. The entities of interest may be, for instance, the entities within an organization and communications between entities within the organization.

The processor 102 may execute the instructions 114 to group the entities into a plurality of clusters 210, which may include individual clusters 210a-210n, based on the information included in the extracted connectivity matrix 202. For instance, the processor 102 may group entities that exhibit similar behaviors with respect to each other and may group the entities into the clusters 210a-210n based on the extracted connectivity matrix 202 with the reduced dimensionality. Particularly, the processor 102 may identify each row in the connectivity matrix 202 corresponding to an entity as a feature vector of the entity. The processor 102 may use any suitable clustering method on the feature vectors of the entities. Some examples of suitable clustering methods may include K-Means clustering, mean-shift clustering, density-based spatial clustering of applications with noise, expectation-maximization clustering, or the like. In addition, the processor 102 may use any suitable cluster quality to determine the number of clusters 210a-210n, such as silhouette coefficient, the elbow method, or the like.

Figure 3:
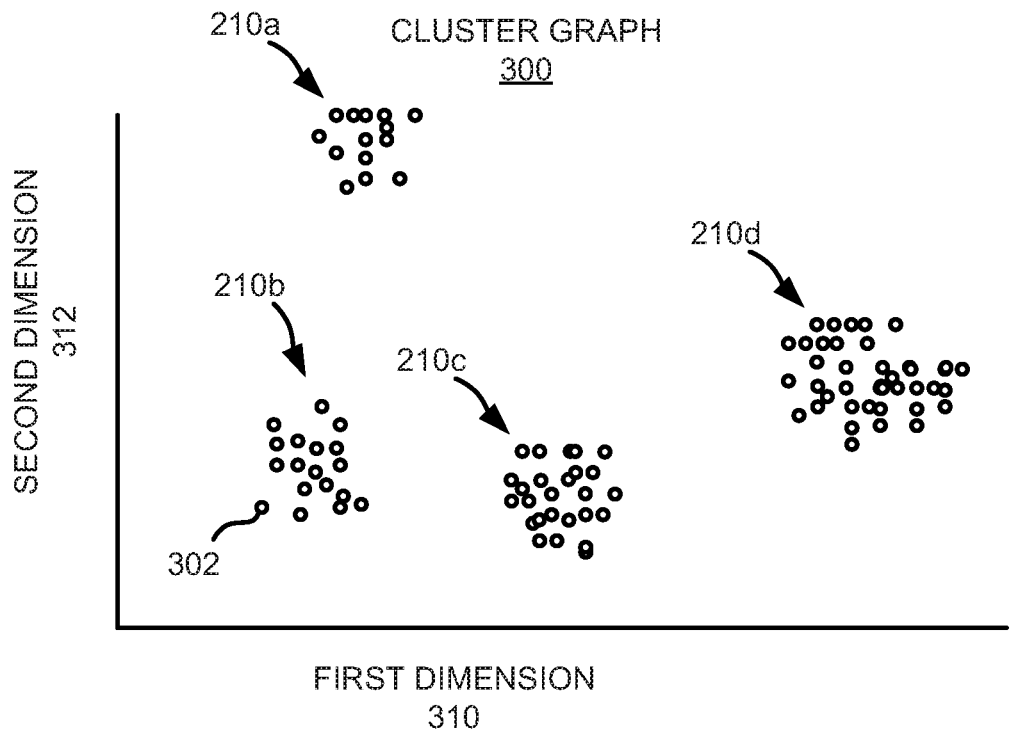
FIG. 3 depicts an example cluster graph.

An example of a cluster graph 300 is depicted in FIG. 3. As shown, the cluster graph 300 may include a first axis that denotes a first dimension 310 and a second axis that denotes a second dimension 312. The first dimension 310 and the second dimension 312 may represent components of a transformed space. In the cluster graph 300, each of the points 302 may represent an entity and each of the clusters 210a-210n may include entities that share some common behaviors denoted by the first dimension 310 and the second dimension 312.

In some examples, prior to grouping the entities into the clusters 210a-210n, the processor 102 may reduce the dimensionality of the data in the connectivity matrix 202. The processor 102 may employ any suitable type of dimensionality reduction method to reduce the dimensionality. Some examples of the dimensionality reduction method may include principal component analysis (RCA), stochastic neighbor embedding, multidimensional scaling, kernel PCA, uniform manifold approximation and projection (UMAP), and the like.

With reference back to FIG. 1, the processor 102 may execute the instructions 116 to, for each of the clusters 210a-210n in the plurality of clusters 210, identify at least one representative entity 212a-212n that is to represent the entities in the particular cluster 210a-210n. The processor 102 may identify the at least one representative entity 212a-212n for each of the clusters 210a-210n through implementation of any suitable cluster characterization operation. The processor 102 may identify the at least one representative entity 212a-212n for each of the clusters 210a-210n to represent the respective cluster because, for instance, the clusters 210a-210n may each include a relatively large number of entities. In one regard, information pertaining to the representative entities 212a-212n of the clusters 210a-210n may be processed, analyzed, communicated, and/or the like, more efficiently than information pertaining to all of the entities in the clusters 210a-210n.

An example of a cluster characterization operation is an operation that identifies the most representative members of the clusters 210a-210n. In this example, the processor 102 may, for each of the clusters 210a-210n, identify a predefined number of most representative members of the clusters 210a-210n, in which the identified predefined number of most representative members of the cluster 210a-210n corresponds to the at least one identified representative entity 212a-212n of the cluster 210a-210n. The predefined number of most representative members may be user-defined, based on sizes of the clusters 210a-210n, based on the number clusters 210a-210n, and/or the like.

The most representative members (representative entities 212a) of a cluster 210a may be, for instance, the most central entities in the cluster 210a, e.g., the predefined number of entities that are the closest to the centroid or the medoid of the cluster 210a. By way of particular example, to identify the predefined number of most representative members (representative entities 212a) of the cluster 210a, the processor 102 may use the silhouette coefficient (SC) of an entity as a measure to identify affinity of the entity to the cluster 210a. The SC of an entity i may be defined as:

$$SC(i) = \frac{b(i) - a(i)}{\max(b(i), a(i))}$$

where a(i) is the average distance of entity i from all other entities in its cluster 210a, and b(i) is the average distance of entity i from all other entities in the neighboring cluster 210b, where the neighboring cluster 210b is defined as the cluster with a minimum average distance from entity i. The SC of the entity i varies between −1 and 1, with 1 implying perfect affinity while −1 indicates the entity is least representative of the cluster 210a. The processor 102 may compute the SCs of all of the entities in the cluster 210a, may sort the entities, and may pick the top k entities as the representative entity(ies) of the cluster 210a. In addition, the processor 102 may compute the SCs of all of the entities in the other clusters 210b-210n, sort the entities in the respective clusters 210b-210n, and pick the top k entities in the respective clusters 210b-210n as the representative entity(ies) of the respective clusters 210b-210n.

Another example of a cluster characterization operation is an operation that identifies a predefined number of top remote entities with which the entities in the cluster 210a communicate, in which the most representative set of entities in the cluster 210a that communicate with the identified predefined number of top remote entities may correspond to the at least one identified representative entity 212a-212n of the cluster 210a. The predefined number of top remote entities may be user-defined, based on sizes of the clusters 210a-210n, based on the number clusters 210a-210n, and/or the like.

By way of particular example, to identify the top remote entities, the processor 102 may characterize a cluster 210a with the top remote (e.g., destination) entities that the entities in the cluster 210a are most likely to communicate with. For instance, the processor 102 may compute a score for each remote entity, sort each of the remote entities based on their computed scores, and select the top k remote entities as the representative entity(ies) of the cluster 210a. A higher score may indicate a higher relevance to the cluster 210a. In this example, the processor 102 may define a remote entity score (RES) for a remote entity j as the normalized number of entities in the most representative set that communicate with entity j, that is:

$$RES(j) = \frac{1}{|M_c|} \sum_{i \in M_c} 1_{f_{ij} > 0}$$

where $1_A$ is an indicator function that is 1 if A is true, and 0 otherwise; $f_{ij}$ is an entry in the connectivity matrix 202; $M_c$ is the set of most representative entities in cluster c. The processor 102 may identify the set of most representative entities in the cluster 210a as the representative entity(ies) of the cluster 210. The processor 102 may identify the representative entities in each of the other clusters 210b-210n in similar manners.

A further example of a cluster characterization operation is a characterization operation that may be based on a volume of traffic associated with the most representative entities in a cluster 210a. In this example, the processor 102 may characterize the cluster 210a with the volume of traffic associated with the most representative entities in the cluster 210a ($M_c$). The volume of traffic may be in terms of the number of flows, number of bytes, number of packets, and/or another available measure of traffic. The processor 102 may normalize the traffic by the size of the cluster 210a, specifically, for cluster c:

$$V(c) = \frac{1}{|\mathbb{M}_c|} \sum_{i \in \mathbb{M}_c} \sum_j f_{ij}$$

The processor 102 may also condition the volume (V) of traffic on several factors, such as a particular destination or source port number, a particular protocol, or the like. The processor 102 may also compute additional aggregates, e.g., a number of distinct destination or source ports communicated on, most frequent protocol, number of different geographical regions communicated with, or the like.

The processor 102 may compute the volumes (V) of some of the entities in the cluster 210a, may sort the entities based on the computed volumes, and may pick the top k entities as the representative entity(ies) of the cluster 210a. For instance, the processor 102 may compute the volumes (V) of some of the entities in the cluster 210a, e.g., a certain number of the entities near the centroid or the medoid of the cluster 210a. In addition, the processor 102 may compute the volumes (V) of some of the entities in the other clusters 210b-210n, sort the entities in the respective clusters 210b-210n according to the computed volumes, and pick the top k entities in the respective clusters 210b-210n as the representative entity(ies) of the respective clusters 210b-210n.

In some examples, the processor 102 may discard timestamps while extracting the connectivity matrix 202 and thus, may not use temporal features in grouping the entities into clusters 210a-210n. In some instances, however, a cluster 210a may include activity in a specific interval within a time window and thus, the temporal distribution of the activities in the cluster 210a may be useful in determining the representative entity(ies) of the cluster 210a. In these instances, the processor 102 may plot, for each of the clusters 210a-210n, a histogram of the timestamps associated with the entities in $\mathbb{M}_c$ by retrieving those timestamps from the original data set. The processor 102 may also output the plotted histogram of the timestamps, which may be useful in determining behaviors of the entities in the clusters 210a-210n.

In some examples, the processor 102 may, based on the affinity of an entity to its cluster, identify anomalous entities at each time step. To identify the k most anomalous entities in each cluster 210a-210n, the processor 102 may find k entities with the lowest SC. The processor 102 may also output the identified anomalous entities, which may be useful in determining behaviors of the entities in the clusters 210a-210n.

In some examples, the processor 102 may assist in labeling characterizations of the entities. That is, for instance, the processor 102 may provide an analyst with the identified representative entities, e.g., via one or more visualizations on an interactive dashboard. The analyst may label the clusters 210a-210n based on observed characteristics of the identified representative entities. The label may include one or more dimensions, e.g., activity summary (benign, malicious, unknown), application protocols (HTTP, HTTPS, DNS, etc.), entity summary (devOps servers, engineering workstations, etc.), summary of most common destination entities (domain names, location, etc.), and/or the like. The labels and characteristics may be recorded such that in future time windows, an analyst may examine only new or recurring "unknown" activities during this step. The processor 102 may provide a graphical user interface (GUI) based "guided tour", to streamline the labeling process.

The processor 102 may execute the instructions 118 to output the identified at least one representative entity for identification of group behaviors of the entities in the clusters 210a-210n, in which the identified group behaviors may be used for network security. According to examples, the processor 102 may output the identified representative entity(ies) to another computing device, processor, or the like, that may analyze and determine behaviors of the identified representative entity(ies) of the clusters 210a-210n. The another computing device, processor, or the like, may also assign the determined behaviors of the identified representative entity(ies) of the clusters 210a-210n to the other entities in the respective clusters 210a-210n. In some examples, a user, an analyst, an administrator, or the like, may analyze and determine the behaviors of the identified representative entity(ies) of the clusters 210a-210n and may assign those determined behaviors to the other entities in the respective clusters 210a-210n.

In addition or alternatively, the processor 102 may analyze and determine the behaviors of the identified representative entity(ies) of the clusters 210a-210n and may assign those determined behaviors to the other entities in the respective clusters 210a-210n. In other words, the processor 102 may determine the group behaviors of the clusters 210a-210n and thus the behaviors of the entities in the respective clusters 210a-210n. As used herein, the behaviors may include, for instance, the IP addresses to which the entities in the clusters 210a-210n normally communicate, a normal number of bytes exchanged by the entities during communications, the number of packets exchanged by the entities during communications, durations of the communications by the entities, and/or the like.

According to examples, the processor 102 may apply a policy, e.g., an IT management policy, a security policy, and/or the like, to the entities, e.g., in an organization or enterprise, based on the determined respective group behaviors. That is, for instance, the processor 102 may apply a policy that may indicate that a security threat may exist based on the behavior of an entity being anomalous with respect to the determined group behavior of the cluster 210a to which the entity belongs. By way of example in which the determined group behavior indicates that the entities in the cluster 210a normally communicate with certain IP addresses and an entity in the cluster 210a is determined to communicate with a number of different IP address, the processor 102 may determine that the entity's behavior is anomalous. In addition, the processor 102 may take or may trigger the taking of an action to address the anomalous behavior, such as to mitigate or stop the action. As another example, the processor 102 may take or may trigger the taking of an action to improve operations of IT services based on the identified anomalous behavior.

According to examples, the processor 102 may track clusters 210a-210n of entities over successive time windows to identify any emerging clusters, defunct clusters, reemerging clusters, and/or continuing clusters. That is, for instance, the processor 102 may, for a successive time window, group the entities into another plurality of clusters 210a-210n and may compare the other plurality of clusters 210a with the previously grouped plurality of clusters 210a-210n. In addition, based on the comparison, the processor 102 may determine whether any of the other plurality of clusters 210a is an emerging cluster, e.g., a new cluster, and whether an emerging cluster is a reemerging cluster. The processor 102 may further determine whether any of the previously grouped plurality of clusters 210a-210n is a defunct cluster, e.g., a removed cluster. The processor 102 may also determine from the comparison whether any of the previously grouped plurality of clusters 210a-210n matches any of the other plurality of clusters 210a-210n and those matching clusters may be identified as continuing clusters.

In some examples, to perform the matching of the clusters 210a-210n, the processor 102 may construct a bipartite graph from the previously grouped clusters 210a-210n ($\mathbb{C}_t$) and the newly grouped clusters 210a-210n ($\mathbb{C}_{t+1}$), with clusters in $\mathbb{C}_t$ forming one set of vertices, and those in $\mathbb{C}_{t+1}$ forming the other. The processor 102 may create a weighted edge between two vertices based on the Jaccard similarity (JS) between the two corresponding clusters. JS may be defined as the ratio of the intersection of the clusters to their union. The processor 102 may compute JS between two clusters as:

$$JS(c_i, c_j) = \frac{|c_i \cap c_j|}{|c_i \cup c_j|} \text{ where } c_i \in \mathbb{C}_t, c_j \in \mathbb{C}_{t+1}, 0 \le JS(c_i, c_j) \le 1$$

The processor 102 may create an edge between $c_i$ and $c_j$ if $JS(c_i, c_j) > JS_{threshold}$. That is, the processor 102 may create an edge if $c_i$ and $c_j$ are similar enough that they may be potentially matched, and to make sure they are sufficiently similar, $JS_{threshold}$ may be chosen to be a high value, e.g., greater than about 0.9 or 0.8. The processor 102 may also weight each edge with its JS value. In a variant implementation, while computing JS, the processor 102 may only consider the most representative members in each cluster ($\mathbb{M}_c$).

Figure 4:
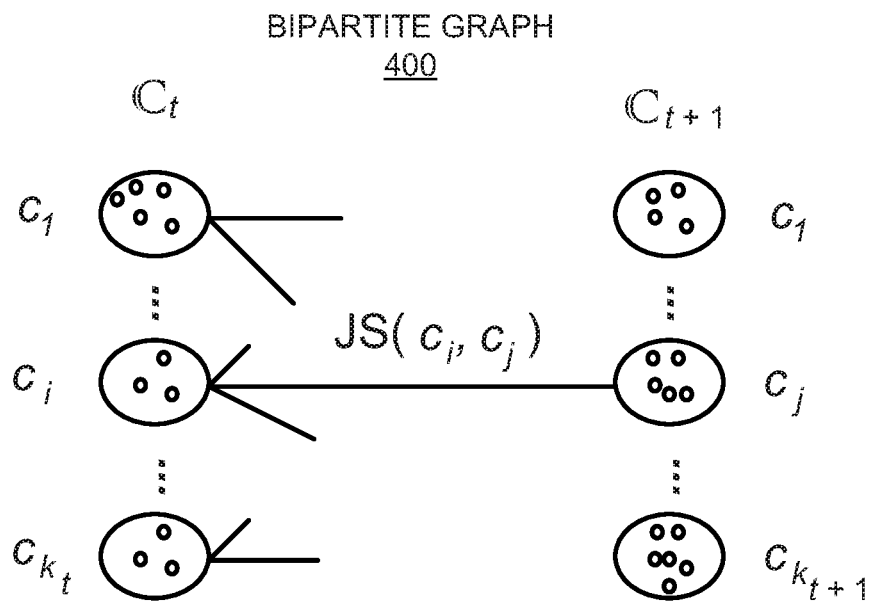
FIG. 4 depicts an example bipartite graph.

An example of a bipartite graph 400 is shown in FIG. 4. As shown in that figure, the number of clusters in $\mathbb{C}_t$ are $k_t$ while in $\mathbb{C}_{t+1}$ the number of clusters is $k_{t+1}$. Having constructed a weighted bipartite graph, the problem of matching the clusters reduces to finding a maximal weighted bipartite matching, which may find a set of edges with maximal weights such that no two selected edges share a vertex. In some instances, the matching may not be a perfect matching in that all of the vertices may not have a selected incident edge. The processor 102 may match the vertices with a selected incident edge and the vertices that do not have a selected incident edge may be unmatched. The processor 102 may identify the matched vertices as continuing clusters, the unmatched vertices in $\mathbb{C}_t$ as defunct clusters, and the unmatched vertices in $\mathbb{C}_{t+1}$ as emerging clusters.

The processor 102 may maintain a history of recent defunct clusters such that, when a defunct cluster reemerges, the processor 102 may start with its prior given labels rather than a new cluster. Some clusters may show periodic behavior, e.g., reemerge every weekend. For example, at time t, the processor 102 may identify a cluster 210a that may have been caused by undesirable activity and the processor 102 may have taken steps to eliminate that activity. Over time, changes may occur that may lead to that activity re-occurring at time t+x. The processor 102 may determine that the cluster 210a formed by the undesirable activity has reemerged and may label the cluster 210a with the previously assigned label. In some examples, the processor 102 may take an action that may eliminate the activity again. In other examples, the processor 102 may output the identification of the cluster 210a and the assigned label such that a user, an analyst, an administrator, or the like, may determine a root cause as to why the activity reemerged and additional actions taken to prevent the activity from occurring again.

For the clusters that are identified as emerging clusters, the processor 102 may further identify at least one representative entity that is to represent the entities in the cluster. Additionally, for the clusters that are identified as defunct clusters, the processor 102 may remove the previously identified representative entity(ies) for those clusters. Furthermore, the processor 102 may maintain the previously identified representative entity(ies) for those clusters. The processor 102 may also output the identified representative entity(ies) for the clusters 210a-210n for use, for instance, for IT management, which may include network security.

The processor 102 may repeat the above-described operation for additional successive time windows to continuously identify emerging clusters, defunct clusters, reemerging clusters, and/or continuing clusters. The processor 102 may further identify the representative entity(ies) of the clusters 210a-210n identified in the successive time windows and may output the identified representative entity(ies).

Tracking the clusters 210a-210n over time may enable monitoring of dynamic behavior of entities in network traffic data 204. In addition, the actions of the entities may be prioritized by, for instance, focusing on emerging and reemerging clusters first, continuing clusters second (in particular, any for which actions were previously taken to try and eliminate them), and defunct clusters third (e.g., close open tickets related to actions taken to eliminate a now defunct cluster). The processor 102 may also apply various policies, for example, for re-checking labels: a new label is valid for one month, then may be rechecked (in particular, malicious traffic may try to masquerade as benign traffic; revisiting labels may help catch such attempts). The processor 102 may further provide or update a dashboard with labels assigned to the clusters 210a-210n by a first analyst such that a second analyst may view the labels and may agree or disagree with the labels by viewing the labels on the dashboard. The processor 102 may also ask additional analysts to check a label if, for instance, a number of entities in a cluster 210a grows beyond some threshold over time.

Figure 5A:
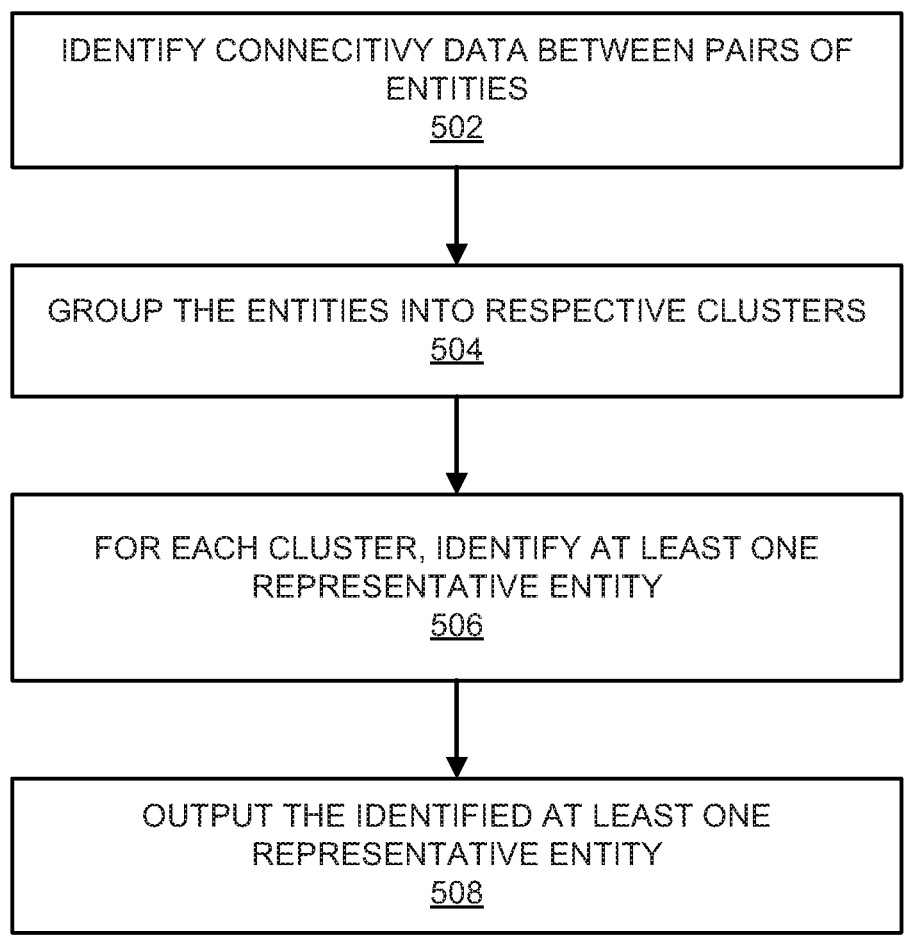
FIGS. 5A and 5B, respectively depict flow diagrams of example methods for identifying and outputting at least one representative entity for identification of group behaviors of entities in a plurality of clusters, in which the identified group behaviors may be used for IT management.
Figure 5B:
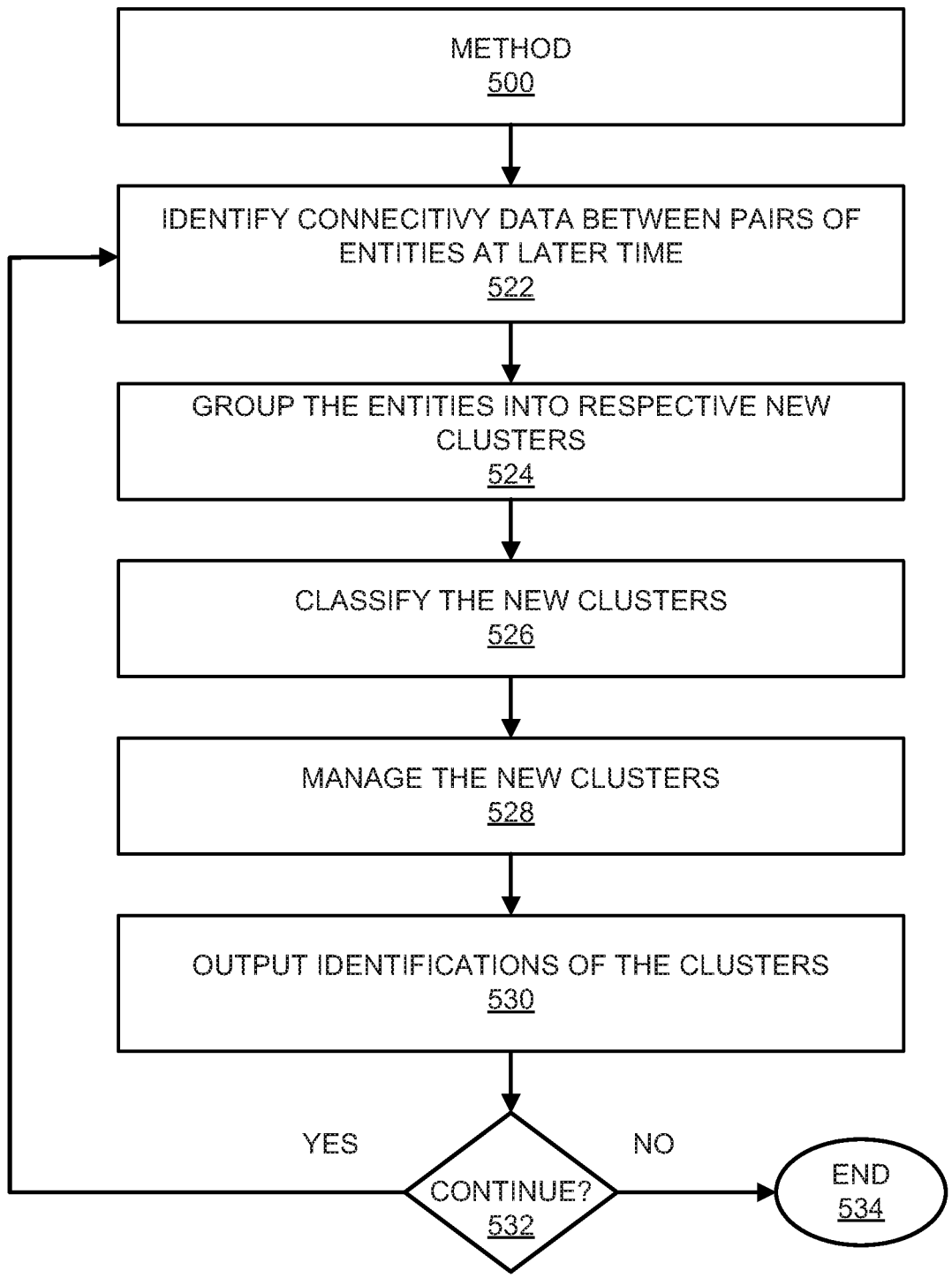

Turning now to FIGS. 5A and 5B, there are respectively shown flow diagrams of example methods 500 and 520 for identifying and outputting at least one representative entity for identification of group behaviors of entities in a plurality of clusters 210a-210n, in which the identified group behaviors may be used for IT management. As discussed herein, the processor 102 may execute the method 520 following execution of the method 500. It should be understood that the methods 500 and 520 depicted in FIGS. 5A and 5B may include additional operations and that some of the operations described therein may be removed and/or modified without departing from the scopes of the methods 500 and 520. The descriptions of the methods 500 and 520 are also made with reference to the features depicted in FIGS. 1-4 for purposes of illustration. Particularly, the processor 102 depicted in FIGS. 1 and 2 may execute some or all of the operations included in the methods 500 and 520.

With reference first to FIG. 5A, at block 502, the processor 102 may identify connectivity data between pairs of entities over a network. The processor 102 may identify the connectivity data from network traffic data 204 as discussed herein. At block 504, the processor 102 may group the entities into respective clusters 210a-210n based on the identified connectivity data between pairs of entities. For instance, the processor 102 may extract a connectivity matrix 202 from the network traffic data 204 and may group the entities into the clusters 210a-210n from the connectivity matrix 202. The processor 102 may also reduce the dimensionality of the connectivity matrix 202 as discussed herein and may also identify the frequencies of connections between pairs of entities over the network based on data included in the connectivity matrix 202 with the reduced dimensionality.

At block 506, the processor 102 may, for each of the clusters 210a-210n, identify at least one representative entity 212a-212n that is to represent the entities in the cluster 210a-210n. The processor 102 may identify the representative entity(ies) 212a-212n in any of the manners discussed herein. In addition, at block 508, the processor 102 may output the identified representative entity(ies) for identification of group behaviors of the entities in the clusters 210a-210n, in which the identified group behaviors may be used for application of a security policy on the network as also discussed herein. The processor 102 may also determine respective group behaviors of the clusters 210a-210n and may apply a policy to the entities based on the determined respective group behaviors.

With reference now to FIG. 5B, following implementation of the method 500, at block 522 the processor 102 may identify connectivity data between pairs of entities during a later time window (e.g., at a time window t+x). In addition, at block 524, the processor 102 may group the entities into respective new clusters 210a-210n based on the identified connectivity data between pairs of entities during the later time window. At block 526, the processor 102 may classify (e.g., identify) the new clusters 210a-210n grouped for the later time window as being an emerging cluster, a reemerging cluster, or a continuing cluster and may identify, based on the new clusters 210a-210n, whether any of the clusters grouped during a time window prior to the later time window is a defunct cluster. As discussed herein, the processor 102 may make these determinations by comparing the new clusters with the previously grouped clusters, identifying the new clusters as being an emerging cluster or a continuing cluster and the clusters grouped during the time window prior to the later time window as a defunct cluster based on the comparison.

At block 528, the processor 102 may manage the new clusters 210a-210n based on the identified types of the clusters 210a-210n. For instance, for each of the emerging clusters, the processor 102 may identify at least one representative entity as discussed herein. For reemerging clusters, the processor 102 may identify a previously defined label of the clusters and may take some action based on, for instance, if the clusters were formed through an undesirable activity. For each of the continuing clusters, the processor 102 may determine the previously defined label. In addition, the processor 102 may discard defunct clusters.

At block 530, the processor 102 may output the identifications of each of the clusters 210a-210n as being one of an emerging cluster, a reemerging cluster, a continuing cluster, and/or a defunct cluster. The processor 102 may also output the representative entities of the emerging clusters as well as of the continuing and reemerging clusters. Following block 530, at block 532, the processor 102 may determine whether the method 520 is to continue. Based on a determination that the method 520 is to continue, the processor 102 may repeat blocks 522-532 to identify and output identifications and/or representative entities of the clusters 210a-210n as these change over time. However, based on a determination that the method 520 is not to continue, the processor 102 may end the method 520 at block 534.

Some or all of the operations set forth in the methods 500 and 520 may be contained as utilities, programs, or subprograms, in any desired computer accessible medium. In addition, the methods 500 and 520 may be embodied by computer programs, which may exist in a variety of forms. For example, the methods 500 and 520 may exist as machine-readable instructions, including source code, object code, executable code or other formats. Any of the above may be embodied on a non-transitory computer-readable storage medium.

Examples of non-transitory computer-readable storage media include computer system RAM, ROM, EPROM, EEPROM, and magnetic or optical disks or tapes. It is therefore to be understood that any electronic device capable of executing the above-described functions may perform those functions enumerated above.

Figure 6:
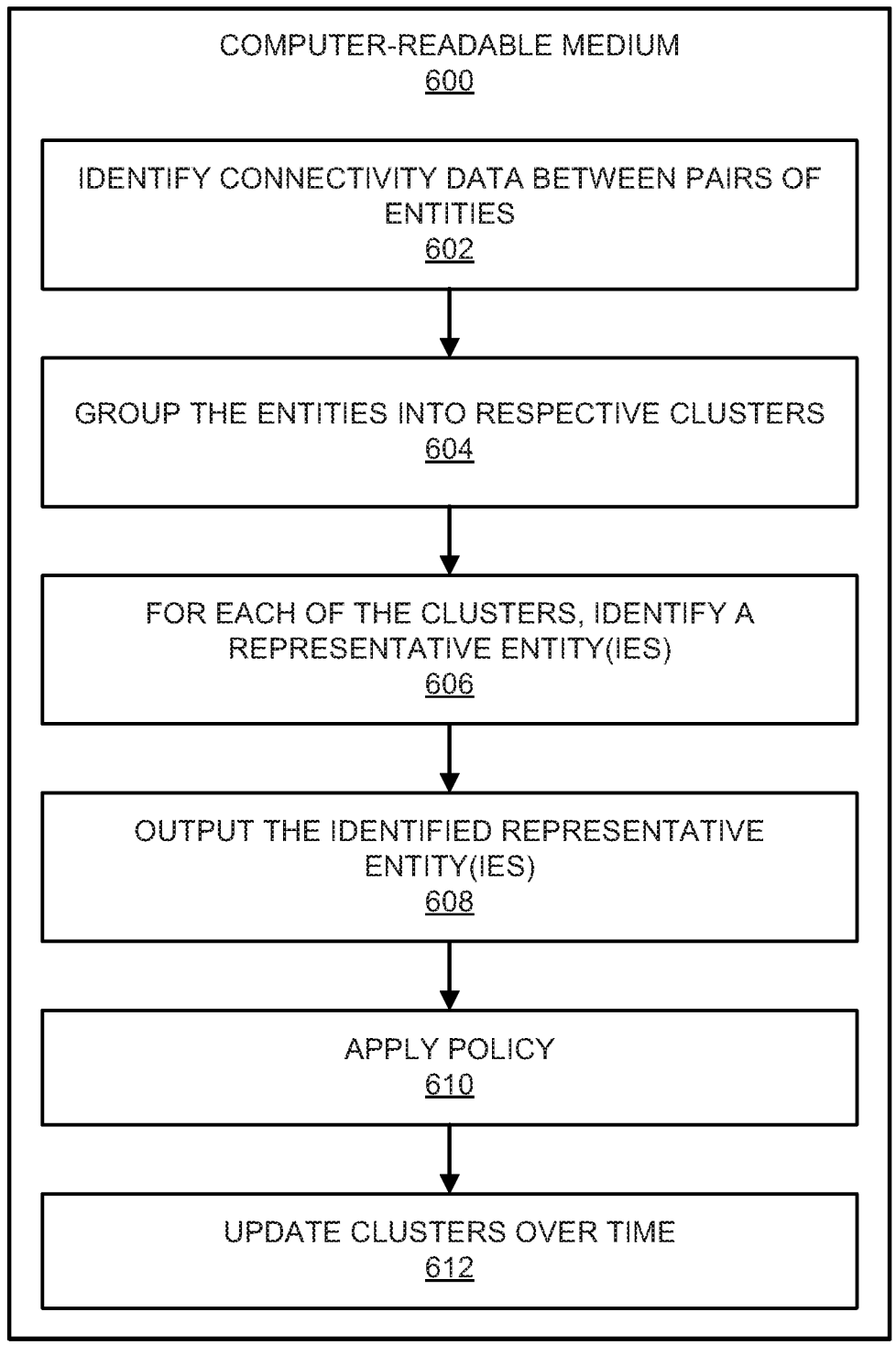
FIG. 6 shows a block diagram of an example computer-readable medium that may have stored thereon computer-readable instructions for identifying and outputting at least one representative entity for identification of group behaviors of entities in a plurality of clusters, in which the identified group behaviors may be used for IT management.

Turning now to FIG. 6, there is shown a block diagram of an example computer-readable medium 600 that may have stored thereon computer-readable instructions for identifying and outputting at least one representative entity for identification of group behaviors of entities in a plurality of clusters 210a-210n, in which the identified group behaviors may be used for IT management. It should be understood that the example computer-readable medium 600 depicted in FIG. 6 may include additional instructions and that some of the instructions described herein may be removed and/or modified without departing from the scope of the computer-readable medium 600 disclosed herein. The computer-readable medium 600 may be a non-transitory computer-readable medium, in which the term "non-transitory" does not encompass transitory propagating signals.

The computer-readable medium 600 may have stored thereon machine-readable instructions 602-608 that a processor, such as the processor 102 depicted in FIG. 1, may execute. The computer-readable medium 600 may be an electronic, magnetic, optical, or other physical storage device that contains or stores executable instructions. The computer-readable medium 600 may be, for example, Random Access memory (RAM), an Electrically Erasable Programmable Read-Only Memory (EEPROM), a storage device, an optical disc, and the like.

The processor may fetch, decode, and execute the instructions 602 identify connectivity data between pairs of entities over a network during a first time window. The processor may fetch, decode, and execute the instructions 604 to group the entities into respective clusters based on the identified connectivity data between pairs of entities during the first time window. The processor may fetch, decode, and execute the instructions 606 to, for each of the clusters 210a-210n, identify at least one representative entity that is representative of the entities in the cluster 210a-210n. The processor may fetch, decode, and execute the instructions 608 to output the identified at least one representative entity for identification of group behaviors of the entities in the clusters 210a-210n, in which the identified group behaviors are to be used for application of a policy on the network. For instance, the processor may fetch, decode, and execute instructions 610 to determine respective group behaviors of the clusters and apply the policy to the entities based on the determined respective group behaviors.

The processor may also fetch, decode, and execute instructions to update the clusters 210a-210n over time. That is, and as discussed herein, the processor may identify connectivity data between pairs of entities during a second time window (as well as additional subsequent time windows) and may group the entities into respective new clusters 210a-210n based on the identified connectivity data between pairs of entities during the second time window. The processor may further fetch, decode and execute instructions to compare the new clusters with the clusters, identify the new clusters grouped for the second time window as being an emerging cluster or a continuing cluster, identify, based on the new clusters, whether any of the clusters grouped during the first time window is a defunct cluster, and output the identification of an emerging cluster, a continuing cluster, a reemerging cluster, and/or a defunct cluster.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration and are not meant as limitations. Many variations are possible within the scope of the disclosure, which is intended to be defined by the following claims—and their equivalents—in which all terms are meant in their broadest reasonable sense unless otherwise indicated.

What is claimed is:

1. An apparatus comprising:
a processor; and
a memory on which is stored instructions that when executed by the processor, cause the processor to:
extract, from network traffic data, a connectivity matrix that identifies connectivity data between entities;
group the entities into a plurality of clusters based on the extracted connectivity matrix;
for each cluster of the plurality of clusters, identify a representative entity to represent the entities in the cluster, including calculating a coefficient for each entity in the cluster based on an average distance between the entity and other entities in the cluster and an average distance between the entity and entities in a neighboring cluster, and selecting an entity having a highest coefficient to be the representative entity of the cluster; and
for each cluster of the plurality of clusters, identify a communication behavior of the representative entity to represent a group behavior of all of the entities in the cluster, wherein the group behavior of the entities in each cluster is to be used for information technology management.

2. The apparatus of claim 1, wherein the instructions further cause the processor to:
track the plurality of clusters over successive time windows to identify any emerging clusters, defunct clusters, reemerging clusters, or continuing clusters; and
output the identified emerging clusters, defunct clusters, reemerging clusters, or continuing clusters.

3. The apparatus of claim 2, wherein to track the plurality of clusters over successive time windows, the instructions further cause the processor to:
for each of the successive time windows, group the entities into another plurality of clusters; and
identify the emerging clusters, defunct clusters, reemerging clusters, or continuing clusters from a comparison of the other plurality of clusters with the plurality of clusters.

4. The apparatus of claim 1, wherein the instructions further cause the processor to:
reduce a dimensionality of the connectivity matrix; and
group the entities into the plurality of clusters based on the connectivity matrix that has the reduced dimensionality.

5. The apparatus of claim 1, wherein the instructions that cause the processor to group the entities into the plurality of clusters include instructions that cause the processor to:
group the entities having similar communication behaviors with respect to each other into the plurality of clusters.

6. The apparatus of claim 1, wherein the instructions further cause the processor to:
for each cluster of the plurality of clusters, identify a predefined number of top remote entities with which the entities in the cluster communicate, wherein the identified predefined number of top remote entities corresponds to the representative entity of the cluster.

7. The apparatus of claim 1, wherein the instructions thither cause the processor to:
for each cluster of the plurality of clusters, identify a predefined number of top volume entities with which the entities communicate, wherein the identified predefined number of volume entities corresponds to the identified representative entity of the cluster.

8. The apparatus of claim 1, wherein the instructions further cause the processor to:
determine the group behavior of the entities in each cluster of the plurality of clusters; and
apply a policy to all of the entities in each cluster based on the determined group behavior.

9. A method comprising:
identifying, by a processor, connectivity data between pairs of entities in a network;
grouping, by the processor, the entities into clusters based on the identified connectivity data between the pairs of entities;
for each cluster of the clusters, identifying, by the processor, a representative entity to represent the entities in the cluster, including calculating a coefficient for each entity in the cluster based on an average distance between the entity and other entities in the cluster and an average distance between the entity and entities in a neighboring cluster, and selecting an entity having a highest coefficient to be the representative entity of the cluster; and
for each cluster in the clusters, identifying, by the processor, a communication behavior of the representative entity to represent a group behavior of all of the entities in the cluster, wherein the group behavior of the entities in each cluster is to be used for application of an information technology management policy on the network.

10. The method of claim 9, further comprising:
identifying connectivity data between the pairs of entities during a later time window; and
grouping the entities into new clusters based on the identified connectivity data between the pairs of entities during the later time window.

11. The method of claim 10, further comprising:
identifying the new clusters grouped during the later time window as being an emerging cluster, a reemerging cluster, or a continuing cluster;
comparing the new clusters with the clusters grouped during a time window prior to the later time window; and
identifying, based on the comparison, whether any of the clusters grouped during the time window prior to the later time window is a defunct cluster.

12. The method of claim 11, further comprising:
outputting an identification of the defunct cluster.

13. The method of claim 9, further comprising:
extracting a connectivity matrix including the connectivity data between the pairs of entities;
reducing a dimensionality in the connectivity matrix; and
identifying frequencies of connections between the pairs of entities over the network based on data included in the connectivity matrix with the reduced dimensionality.

14. The method of claim 9, further comprising:
for each cluster of the clusters, identifying a predefined number of top volume entities with which the entities in the cluster communicate, wherein the identified predefined number of top volume entities in the cluster corresponds to the representative entity of the cluster.

15. The method of claim 9, further comprising:
for each cluster of the clusters, identifying a predefined number of top remote entities with which the entities in the cluster communicate, wherein the identified predefined number of top remote entities corresponds to the representative entity of the cluster.

16. The method of claim 9, further comprising:
determining the group behavior for each cluster of the clusters; and
applying the information technology management policy to all of the entities in the cluster based on the determined group behavior of the cluster.

17. A non-transitory computer-readable medium on which is stored computer-readable instructions that when executed by a processor, cause the processor to:
identify connectivity data between pairs of entities over a network during a first time window;
group the entities into clusters based on the identified connectivity data between the pairs of entities during the first time window;
for each cluster of the clusters, identify a representative entity that is representative of the entities in the cluster, including calculating a coefficient for each entity in the cluster based on an average distance between the entity and other entities in the cluster and an average distance between the entity and entities in a neighboring cluster, and selecting an entity having a highest coefficient to be the representative entity of the cluster; and
for each cluster of the clusters, identify a communication behavior of the representative entity to represent a group behavior of all of the entities in the cluster, wherein the group behavior of the entities in each cluster is to be used for application of an information technology management policy on the network.

18. The non-transitory computer-readable medium of claim 17, wherein the instructions further cause the processor to:
identify connectivity data between the pairs of entities during a second time window; and
group the entities into new clusters based on the identified connectivity data between the pairs of entities during the second time window.

19. The non-transitory computer-readable medium of claim 18, wherein the instructions further cause the processor to:
compare the new clusters grouped during the second time window with the clusters grouped during the first time window;
identify the new clusters as being an emerging cluster, a reemerging cluster, or a continuing cluster;
identify, based on the new clusters, whether any of the clusters grouped during the first time window is a defunct cluster; and
output an identification of the defunct cluster.

20. The non-transitory computer-readable medium of claim 17, wherein the instructions further cause the processor to:
determine the group behavior of the entities in each cluster in the clusters; and
apply the information technology management policy to all of the entities in each cluster based on the determined group behavior.

* * * * *